US007286898B2

(12) United States Patent
Parmenter et al.

(10) Patent No.: US 7,286,898 B2
(45) Date of Patent: Oct. 23, 2007

(54) LEAD TIME REDUCTION FOR MANUFACTURING OF TOOLING

(75) Inventors: Philip Parmenter, Reading (GB); Guido Drees, Lubbecke (DE); Norbert Scheid, Wincheringen (DE)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 11/291,238

(22) Filed: Nov. 30, 2005

(65) Prior Publication Data

US 2007/0124018 A1    May 31, 2007

(51) Int. Cl.
*G06F 19/00* (2006.01)
(52) U.S. Cl. ............... 700/182; 700/192; 700/197; 164/271
(58) Field of Classification Search ............... 700/182, 700/192, 197, 200; 164/271
See application file for complete search history.

(56) References Cited

U.S. PATENT DOCUMENTS

| 5,917,726 | A  | * | 6/1999  | Pryor ........................... 700/95 |
| 6,663,726 | B2 | * | 12/2003 | Abe et al. .................... 148/320 |
| 6,671,572 | B1 | * | 12/2003 | Craft et al. .................. 700/184 |
| 6,754,557 | B2 |   | 6/2004  | Graham |
| 2003/0033041 | A1 | * | 2/2003 | Richey ......................... 700/98 |
| 2004/0243481 | A1 | * | 12/2004 | Bradbury et al. ............. 705/26 |

OTHER PUBLICATIONS

"Computer Aided Fixture Design—A review and Future Trends" -Cecil et al, Advanced Manufacturing Technology, New Mexico State University, 2001.*

* cited by examiner

*Primary Examiner*—Michael D. Masinick

(57) ABSTRACT

The specification and drawings present a new method and a system for organizing and structuring a process of tool manufacturing with a reduced lead time. The manufacturing of the component tooling can be applied (but not be limited) to: mold tooling, injection mold tooling, diecast tooling, press tooling, etc. Several techniques or elements are methodically combined with the focus to reduce overall manufacturing time for tooling components comprising (but not be limited to) the following: a) standard parts are designed, pre-manufactured and stocked in a pre-hardened condition; b) custom 3D CAD libraries are created which represent the standard parts and only allow a tool designer to select standard parts which are held as a pre-manufactured stock; c) manufacturing fixtures are utilized which allow consistent and rapid setup of the pre-manufactured standard components for customized machining operations specific to a tool design.

22 Claims, 7 Drawing Sheets

LEAD TIME REDUCTION FOR MANUFACTURING OF TOOLING

TECHNICAL FIELD

The present invention relates generally to manufacturing and, more specifically, to manufacturing of tooling with a reduced lead time.

BACKGROUND ART

The manufacturing lead-time for injection mold tools is typically 3 to 8 weeks in the telecom industry. The process of manufacturing an injection mold tool is complex and involves many steps, the main ones being:

Component CAD (computer aided design) file import and adjustment/correction;
Mold tool design;
Creation of numerical control programs for CNC (computer numerical control) machine tools;
Rough machining of tool components;
Hardening of tool components;
Finish machining of tool components;
Machining of electrodes for electro discharge machining (EDM);
EDM of tool components; and
Tool assembly.

One of the issues in the manufacture of tooling is the setup of the tool room logistics to minimize the manufacturing lead-time. In consumer product industries where time to market is critical, tooling lead-time is often an important factor for product development.

Furthermore, there are several relevant areas which include (but are not limited to):

Pre-manufactured components. In the mold tool industry there exists standard part suppliers such as STRACK and HASCO. These companies provide catalogue items which are fully finished or can have additional features machined in them by the toolmaker.

Machining of hardened steels. During recent years, machine tool cutter technology and machining operations (such as high speed milling) have developed to a state where it is acceptable as a standard process to machine pre-hardened steel. Historically this was a non preferred manufacturing process because of cutter wear problems and low metal removal rates; typically, hardened steels would have been ground or machined by one of the electro discharge techniques.

CAD libraries. For several years, a feature of Computer Aided Design (CAD) software systems is an ability to create custom libraries of component models. Many CAD systems (e.g., CATIA, UGS, PRO ENGINEER, AUTOCAD) can provide CAD libraries for commercially available catalogue components from suppliers such as STRACK and HASCO. The component suppliers themselves will often provide the libraries as a marketing support for their products.

Customized manufacturing fixtures. To accurately machine a piece of metal, the starting component has to be held firmly in a known location within the cutting zone of the machine tool. This normally involves fixing the component to the machine tool table by clamping the component in a vice or using some form of a magnetic holding device. Once held, the exact location of the component has to be measured to allow offset/adjustment of the programmed cutter path. Where more than one component or a number of similar components are to be machined in the same or similar processes, then a specific support fixture is usually made. This allows easier location and retention of components to be machined in the same orientation/position.

DISCLOSURE OF THE INVENTION

According to a first aspect of the invention, a system for manufacturing of tooling with a reduced lead time, comprises: a library of three-dimensional computer-aided design (CAD) models comprising pre-manufactured standard components which are stored; and a stock of custom manufacturing fixtures, for mounting the pre-manufactured standard components, wherein the pre-manufactured standard components are comprised of pre-hardened steel and each of the pre-manufactured standard components can be mounted on at least one of the custom manufacturing fixtures for machining features in the pre-manufactured standard components specific to a desired tool design.

According further to the first aspect of the invention, the tooling may be mold tooling. Further, the mold tooling may be injection mold tooling.

Further according to the first aspect of the invention, the tooling may be diecast tooling.

Still further according to the first aspect of the invention, the tooling may be press tooling.

According further to the first aspect of the invention, the system may further comprise: a stock of standard pallet and chucking systems, such that each of the custom manufacturing fixtures can be mounted on at least one of the pallet and chucking systems. Further, each of the pre-manufactured standard components, mounted on at least one of the custom manufacturing fixtures, may be installed with a tolerance of 2 μm onto a machine tool for machining the features specific to the desired tool design using the at least one of the pallet and chucking systems.

According still further to the first aspect of the invention, the models may further comprise additional assembly components. Further, the additional assembly components may be retaining strips or screws.

According to a second aspect of the invention, a method for manufacturing tooling with a reduced lead time, comprises the steps of: creating a library of three-dimensional computer-aided design (CAD) models comprising pre-manufactured standard components and storing the pre-manufactured standard components; and creating and storing a stock of custom manufacturing fixtures, for mounting the pre-manufactured standard components, wherein the pre-manufactured standard components are comprised of pre-hardened steel and each of the pre-manufactured standard components can be mounted on at least one of the custom manufacturing fixtures for machining features in the pre-manufactured standard components specific to a desired tool design.

According further to the second aspect of the invention, the tooling may be mold tooling. Further, the mold tooling may be injection mold tooling.

Further according to the second aspect of the invention, the tooling may be diecast tooling.

Still further according to the second aspect of the invention, the tooling may be press tooling.

According further to the second aspect of the invention, the method may further comprises the steps of: mounting at least one of the pre-manufactured standard components on at least one of the custom manufacturing fixtures; loading the at least one of the pre-manufactured standard components mounted on at least one of the custom manufacturing fixtures to a machine tool; and machining the features in the pre-manufactured standard components specific to the desired tool design.

According still further to the second aspect of the invention, the method may further comprises the step of: creating a stock of standard pallet and chucking systems, such that each of the custom manufacturing fixtures can be mounted on at least one of the pallet and chucking systems. Further, each of the pre-manufactured standard components, mounted on at least one of the custom manufacturing fixtures, may be installed with a tolerance of 2 μm onto a machine tool for machining the features specific to the desired tool design using the at least one of the pallet and chucking systems.

According further still to the second aspect of the invention, the models may further comprise additional assembly components. Further, the additional assembly components may be retaining strips or screws.

According to a third aspect of the invention, an electronic device comprising a component manufactured using a system for manufacturing of tooling with a reduced lead time, the system comprises: a library of three-dimensional computer-aided design (CAD) models comprising pre-manufactured standard components which are stored; and a stock of custom manufacturing fixtures, for mounting the pre-manufactured standard components, wherein the pre-manufactured standard components are comprised of pre-hardened steel and each of the pre-manufactured standard components can be mounted on at least one of the custom manufacturing fixtures for machining features in the pre-manufactured standard components specific to a desired tool design.

According to a fourth aspect of the invention, a component manufactured using a system for manufacturing of tooling with a reduced lead time, the system comprises: a library of three-dimensional computer-aided design (CAD) models comprising pre-manufactured standard components which are stored; and a stock of custom manufacturing fixtures, for mounting the pre-manufactured standard components, wherein the pre-manufactured standard components are comprised of pre-hardened steel and each of the pre-manufactured standard components can be mounted on at least one of the custom manufacturing fixtures for machining features in the pre-manufactured standard components specific to a desired tool design.

MODES FOR CARRYING OUT THE INVENTION

Figure 1:
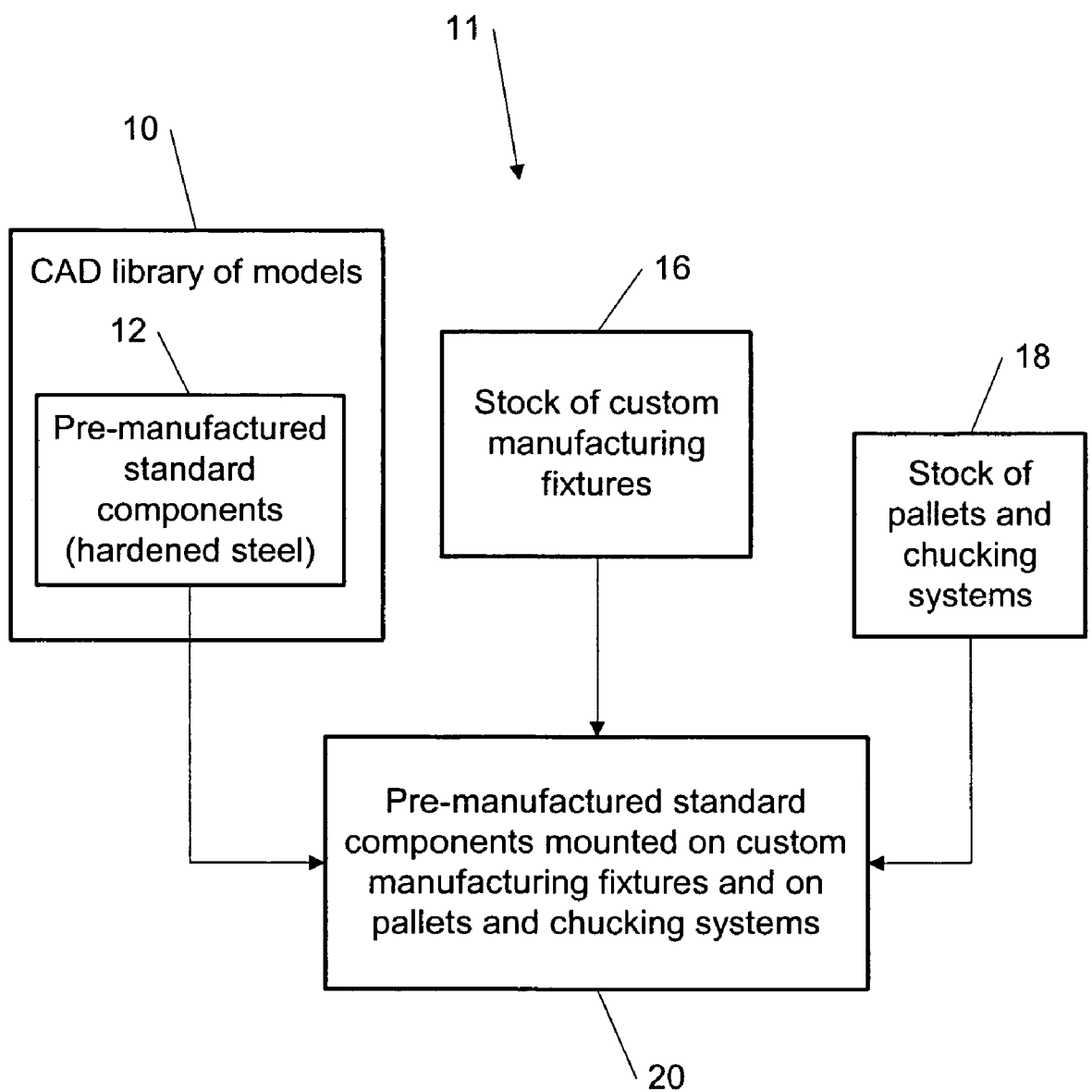
FIG. 1 is a process diagram for organizing and structuring a process of tool manufacturing with a reduced lead time, according to an embodiment of the present invention.

A new method and a system are presented for organizing and structuring a process of tool manufacturing with a reduced lead time. According to embodiments of the present invention, the manufacturing of the tooling can be applied (but not be limited) to: mold tooling, injection mold tooling in particular, diecast tooling, press tooling, etc. The invention relates to the structure and organization of the manufacturing process for achieving minimum possible lead time for the production of the tooling by manufacturing in the most time efficient way.

According to embodiments of the present invention, several techniques or elements are methodically combined with the focus to reduce overall manufacturing time for tooling components. Each element is known separately but only by rigorously aligning each of the following elements can provide a minimum tool manufacturing lead time as described herein.

According to embodiments of the present invention, for achieving the minimum lead time, the manufacturing process comprises the following elements:

3D (three dimensional) CAD models are created in a library for the tool design system. These CAD models represent exactly the standard component designs which are pre-manufactured. Variants in sizes of similar standard components are handled by a number of independent CAD models or parametric dimensions which can be selected only to those corresponding to pre-manufactured component sizes. Where relevant, the CAD models also incorporate additional assembly components such as, e.g., retaining strips and screws. Also the necessary cutters can be built within the CAD models to allow the creation of mating features in other tool components when the custom library feature is introduced to the tool design.

Standard components are designed as starter components. As many features as possible are able to be pre-manufactured as part of the starter component. This means that only the features specific to a new tool design have to be machined during the specific tool production process. These standard components are pre-manufactured and held in a stock (e.g., a KANBAN stock) at the point of tool manufacture. These pre-manufactured standard components are comprised of the pre-hardened steel.

Custom manufacturing fixtures are created which allow the location and clamping of the pre-manufactured standard components on the areas and/or features that are pre-machined. This allows rapid set up of the components for the machining of desired custom component features. The custom fixtures can be built upon a standard pallet and chucking system which can be provided, e.g., from EROWA or SYSTEM 3R. Such systems allow the repeated location of components onto a machine tool table within a tolerance of 2 μm. Thus the manufacturing process, according to an embodiment of the present invention, anticipates having a stock of standard pallet and chucking systems, such that each of the custom manufacturing fixtures can be mounted on at least one of said pallet and chucking systems. It is noted that for the purpose of the present invention, the term pallet, which is frequently used for the big devices, also covers smaller device versions which are sometimes referred to as tool holders. The principle is the same as in traditional pallets and these tool holders are used, e.g., as a base for smaller custom manufacturing fixtures or as electrode holders.

By creating, according to the embodiments of the present invention, pre-hardened starter components which are represented, e.g., in a mold tool design system with CAD models and having pre-manufactured custom fixtures to exactly suit the pre-manufactured standard components, the best solution is achieved for reducing the manufacturing lead time for an injection mold tool. It is noted that the tool manufacturing described in the embodiment of the present invention can be applied to manufacturing of components in electronic devices such as mobile phones (e.g., by rapid injection molding of covers of such electronic devices).

Thus, according to embodiments of the present invention, combination of several techniques in a methodical manner as described above leads to:

Reducing tool design time;

Eliminating hardening time from the tool manufacture critical path;

Significantly reducing component set up time for machining operations on the tool components.

This results in a significant reduction of the lead time for manufacturing of tooling in volume (e.g., for the mold tools the lead time can be reduced from 3-8 weeks to 1 week).

FIG. 1 shows one example among others of a process diagram for organizing and structuring a process 11 of tool manufacturing with a reduced lead time, according to the embodiments of the present invention. A block 10 is a block of a CAD library of models. The models comprise pre-manufactured standard components made of the pre-hardened steel which are shown as a block 12. As described above, the CAD models can incorporate additional assembly components such as, e.g., retaining strips and screws (not shown in FIG. 1). A block 16 identifies a stock of custom manufacturing fixtures and a block 18 identifies a stock of pallets and chucking systems. As shown in the block 20, the pre-manufactured standard components (the block 12) are mounted on custom manufacturing fixtures (the block 16) and further on pallets and chucking systems (the block 18). After the pre-manufactured standard components are mounted, i.e., forming pre-fixtured and palletized work pieces, they are loaded to a machine tool with subsequent machining of features in said pre-manufactured standard components specific to a desired tool design.

Figure 2A:
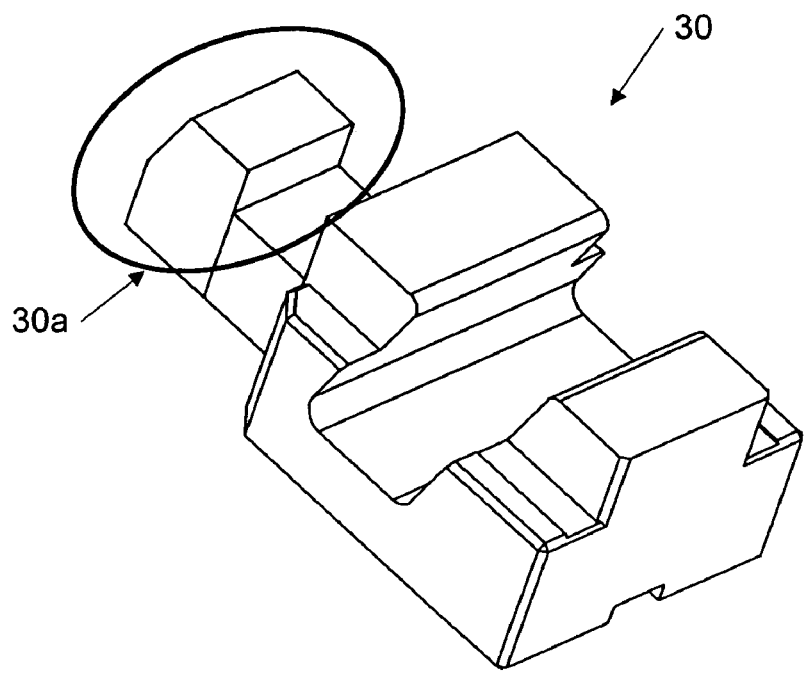
FIGS. 2a and 2b are exemplary pictures of the same pre-manufactured standard component (work piece) viewed from different directions.
Figure 2B:
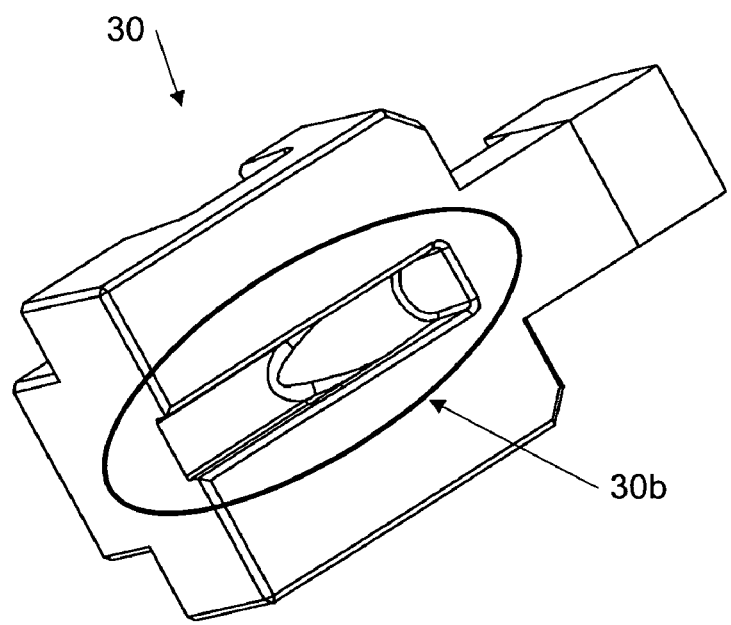

FIGS. 2a and 2b show examples among many others of pictures of the same pre-manufactured standard component (work piece) 30 viewed from different directions. Circled areas 30a and 30b identify areas of the pre-manufactured standard component 30, where a further customization (i.e., machining of the desired features) can occur to manufacture a desired tool from the pre-manufactured standard component 30.

Figure 3A:
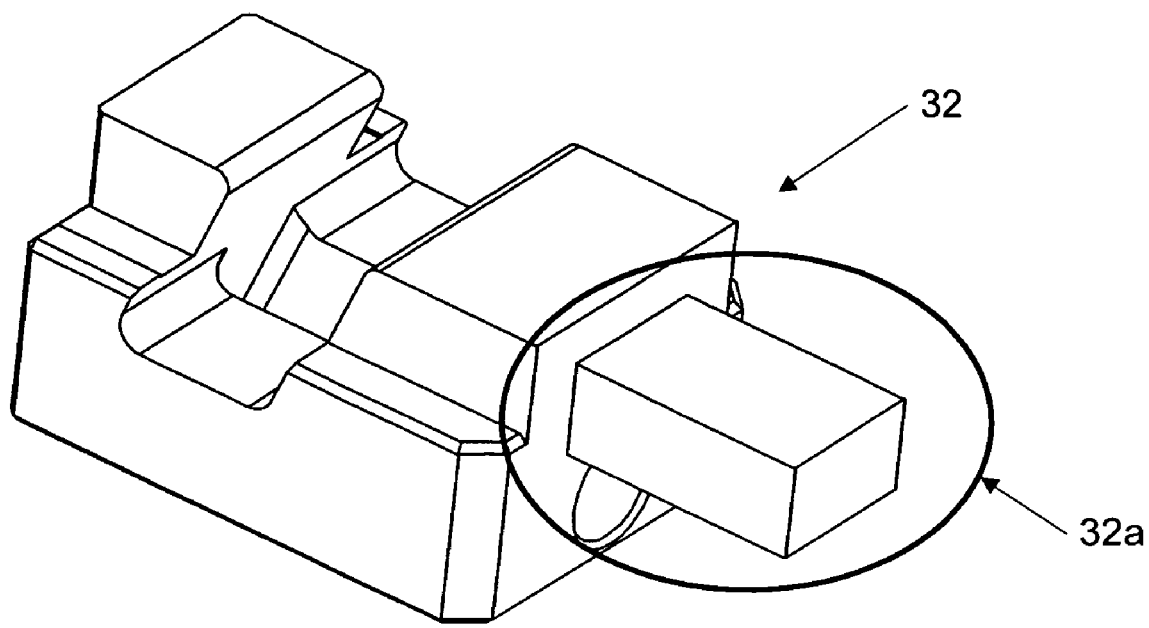
FIGS. 3a and 3b are exemplary pictures of different pre-manufactured standard component (work piece)
Figure 3B:
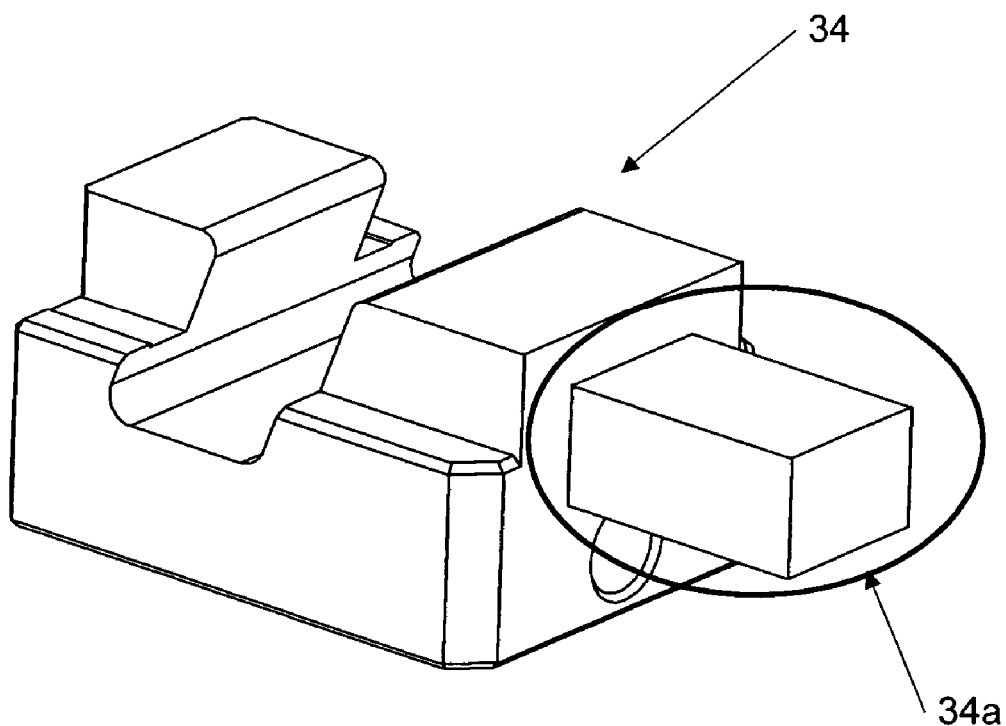

FIGS. 3a and 3b show further examples among many others of pictures of different pre-manufactured standard component (work pieces) 32 and 34. Circled areas 32a and 34a identify areas of the pre-manufactured standard component 32 and 34, respectively, where a further customization (i.e., machining of the desired features) can occur to manufacture a desired tool from the pre-manufactured standard components 32 and 34.

Figure 4:
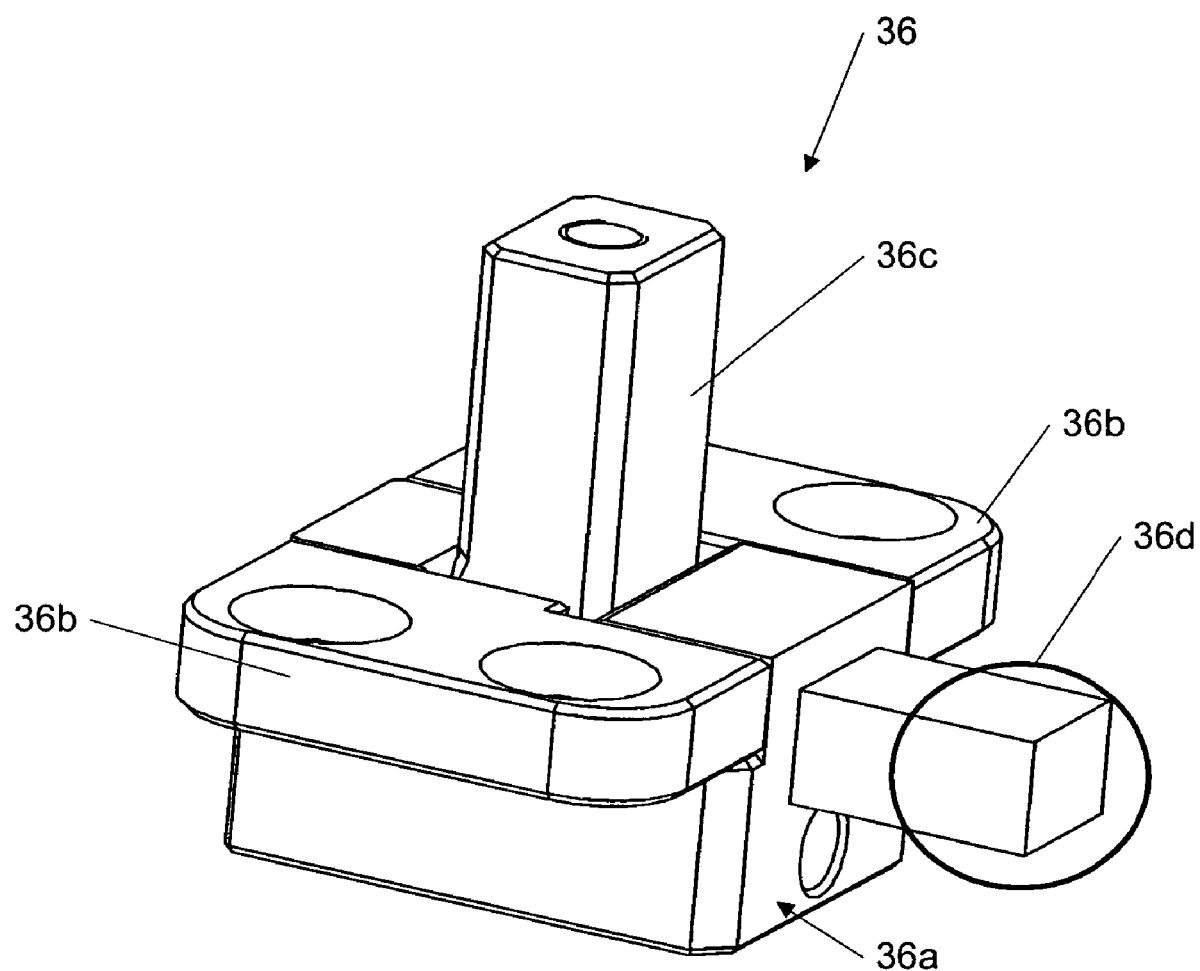
FIG. 4 is a picture of a complete slider kit as depicted in a pre-programmed CAD model.

FIG. 4 show an example among many others of a picture of a complete slider kit 36, e.g., as depicted in a pre-programmed CAD model. The CAD screen can also show individual components of the slider kit 36 with a specific set of dimensions. The slider kit 36 comprises a slider 36a (a pre-manufactured standard component), clamp plates 36b and actuator peg 36c (also pre-manufactured standard components). A circled area 36d identifies areas of the pre-manufactured standard component 36a, where a further customization (i.e., machining of the desired features) can occur to manufacture a desired tool from the pre-manufactured standard component 36a.

According to an embodiment of the present invention, the CAD selection menu can determine if the complete assembly (e.g., the complete slider kit 36) is available to implement the specific tool design. Only predefined options are available in the CAD library, so that the selections match up with the available pre-manufactured stock items. The CAD screen guiding pictures can include the explanatory thumbnail pictures with appropriate dimensions which are used on the screen of the CAD system to guide a tool designer to select the allowable adjustments to the pre-manufactured standard component.

Figure 5A:
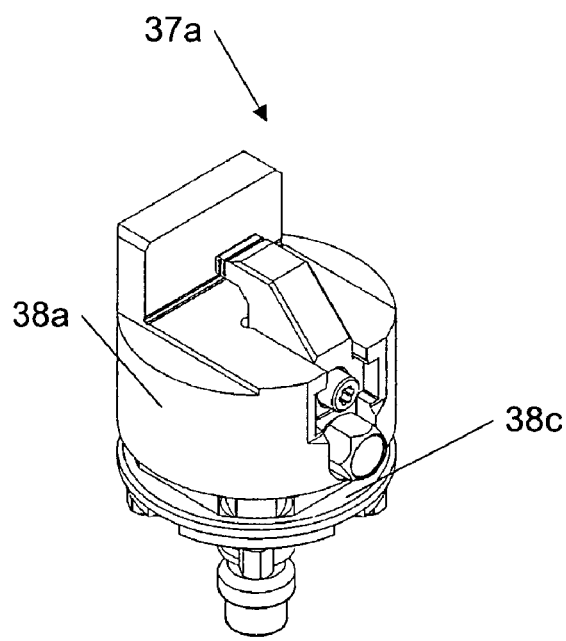
FIGS. 5a and 5b are exemplary pictures of pallets and custom fixtures without (FIG. 5a) and with (FIG. 5b) a pre-manufactured standard component (work piece)
Figure 5B:
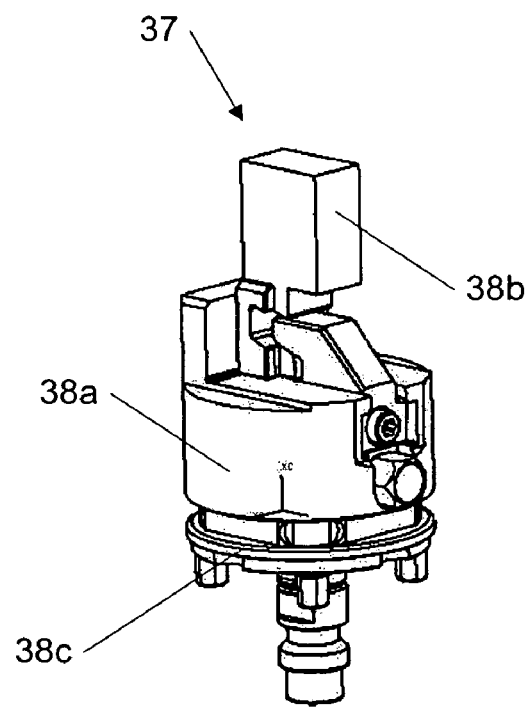

FIGS. 5a and 5b show examples among many others of pictures of assemblies 37a and 37, respectively, comprising a pre-manufactured work pallet 38c and a custom fixture 38a without (FIG. 5a) and with (FIG. 5b) a pre-manufactured standard component (work piece) 38b. In this example, the custom fixture 38a has actually been machined (or bolted) into the top of the pallet 38c. Thus the custom fixture 38a supports and clamps the pre-manufactured standard component 38b to be machined. Typically the pallet 38c is a flat module and the custom fixture 38a is a separate element bolted to its surface of the pallet 38c.

The element 38c is an example of standard pallet and chucking systems (e.g., from EROWA) which are fitted to the tables of the machine tools. The fixture shown can be utilized to hold the component 38b during, e.g., high speed milling and EDM processes.

Figure 6A:
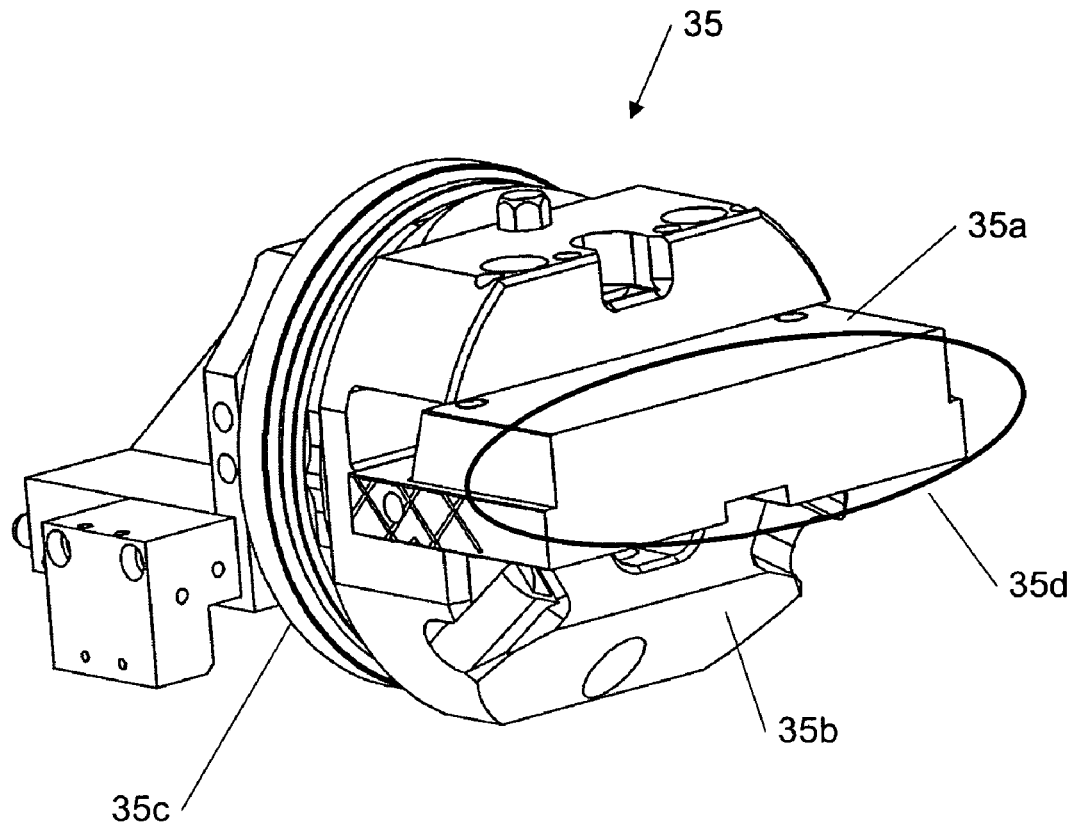
FIGS. 6a and 6b are exemplary pictures of pallets and custom fixtures with a pre-manufactured standard component (work piece)
Figure 6B:
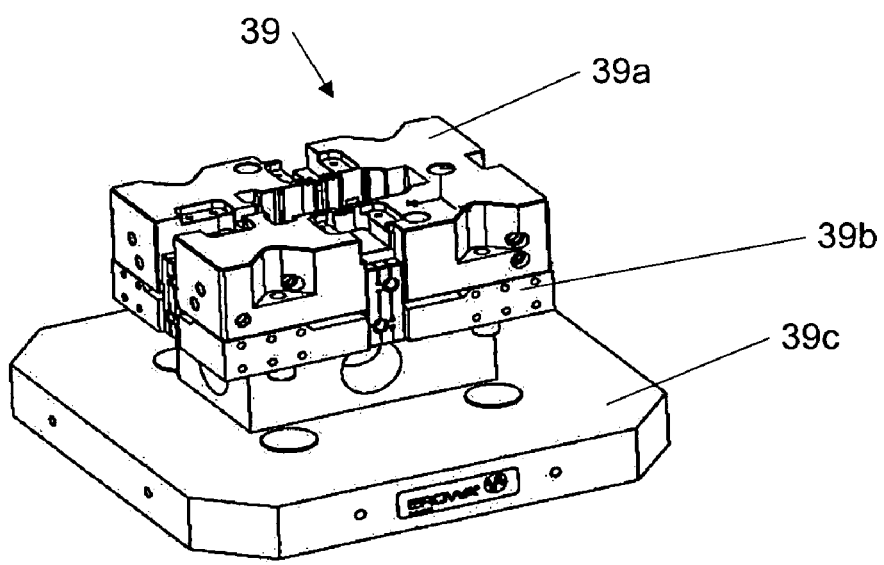

FIGS. 6a and 6b show further examples among many others of pictures of two different assemblies 35 and 39, comprising a pre-manufactured work pallets 35c and 39c and a custom fixtures 35b and 39b, respectively, with corresponding pre-manufactured standard components (work pieces) 35a and 39a, respectively. A circled area 35d in FIG. 6a identifies areas of the pre-manufactured standard component 35a, where a further customization (i.e., machining of the desired features) can occur to manufacture a desired tool from the pre-manufactured standard component 35a.

Figure 7:
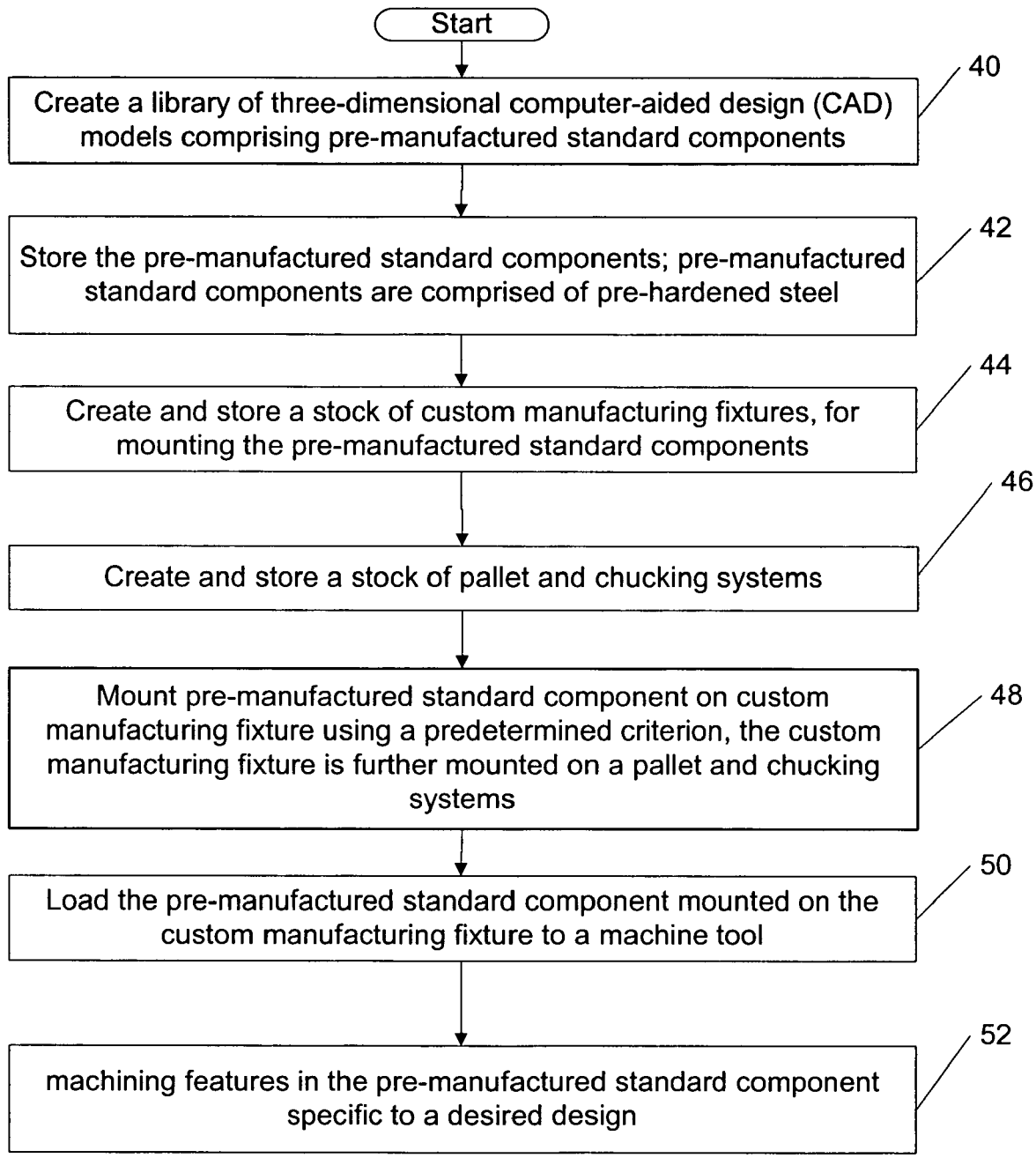
FIG. 7 is a flow chart of a process for organizing and structuring a process of manufacturing of tooling with a reduced lead time, according to an embodiment of the present invention.

FIG. 7 is a flow chart of a process of manufacturing of tooling with a reduced lead time, according to an embodiment of the present invention.

The flow chart of FIG. 7 only represents one possible scenario among others. In a method according to an embodiment of the present invention, in a first step 40, the library 10 of three-dimensional computer-aided design (CAD) models comprising pre-manufactured standard components 12 is created. In a next step 42, the pre-manufactured standard components are stored in a stock, wherein the pre-manufactured standard components are comprised of pre-hardened steel. In a next step 44, a stock of custom manufacturing fixtures 16 (for mounting the pre-manufactured standard components) is created and stored. In a next step 46, a stock of pallet and chucking systems 18 is created and stored.

In a next step 48, the pre-manufactured standard component out of the stock of the pre-manufactured standard component 12 is mounted on the custom manufacturing fixture out of the stock of the custom manufacturing fixtures 16 using a predetermined criterion, the custom manufacturing fixture is further mounted on a pallet and chucking systems out of the stock of the pallet and chucking systems 18. In a next step 50, the pre-manufactured standard component mounted on the custom manufacturing fixture is loaded to an appropriate machine tool. Finally in a next step 52, a desired feature in the pre-manufactured standard component specific to a desired design is machined.

The benefit achieved by using various embodiment of the present invention is the overall reduction of the lead time for the design and manufacture of a specific tool. This reduction is mainly achieved due several factors which are summarized (but not limited to) below:

reduction in machining time for a specific tool due to the fact that significant portions of the components are pre-manufactured;

elimination of hardening time (typically 3 days) from the manufacturing process flow for a specific tool;

faster component setup times by using optimally engineered holding custom manufacturing fixtures;

ability to hold a stock of pre-manufactured standard components at a tool creation location with a high accuracy, etc.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A system, comprising:
   a stock of pre-manufactured standard components created using a library of three-dimensional computer-aided design (CAD) models; and
   a stock of custom manufacturing fixtures, for mounting said pre-manufactured standard components, wherein
   said pre-manufactured standard components are comprised of pre-hardened steel,
   each of said pre-manufactured standard components is configured for mounting can be mounted on at least one of said custom manufacturing fixtures for machining features in said pre-manufactured standard components specific to a desired tool design, and wherein
   tooling with a reduced lead time is manufactured using said system.

2. The system of claim 1, wherein said tooling is mold tooling.

3. The system of claim 2, wherein said mold tooling is injection mold tooling.

4. The system of claim 1, wherein said tooling is diecast tooling.

5. The system of claim 1, wherein said tooling is press tooling.

6. The system of claim 1, wherein said system further comprises:
   a stock of standard pallet and chucking systems, configured to mount each of the custom manufacturing fixtures on at least one of said pallet and chucking systems.

7. The system of claim 6, wherein said system is configured for installing each of said pre-manufactured standard components mounted on at least one of said custom manufacturing fixtures, onto a machine tool for machining said features specific to the desired tool design using said at least one of said pallet and chucking systems.

8. The system of claim 1, wherein said models further comprise additional assembly components.

9. The system of claim 8, wherein said additional assembly components are retaining strips or screws.

10. A method, comprising:
    creating a library of three-dimensional computer-aided design models comprising pre-manufactured standard components and storing said pre-manufactured standard components; and
    creating and storing a stock of custom manufacturing fixtures, for mounting said pre-manufactured standard components, wherein
    said pre-manufactured standard components are comprised of pre-hardened steel,
    each of said pre-manufactured standard components is configured for mounting on at least one of said custom manufacturing fixtures for machining features in said pre-manufactured standard components specific to a desired tool design, and
    said method is for manufacturing of tooling with a reduced lead time.

11. The method of claim 10, wherein said tooling is one of: mold tooling, injection mold tooling, diecast tooling and press tooling.

12. The method of claim 10, further comprising:
    mounting at least one of said pre-manufactured standard components on at least one of said custom manufacturing fixtures;
    loading said at least one of said pre-manufactured standard components mounted on at least one of said custom manufacturing fixtures to a machine tool; and
    machining said features in said pre-manufactured standard components specific to said desired tool design.

13. The method of claim 10, further comprises:
    creating a stock of standard pallet and chucking systems, such that each of the custom manufacturing fixtures is mountable on at least one of said pallet and chucking systems.

14. The method of claim 13, wherein each of said pre-manufactured standard components, mounted on at least one of said custom manufacturing fixtures, is installable with a tolerance of 2 μm onto a machine tool for machining said features specific to the desired tool design using said at least one of said pallet and chucking systems.

15. The method of claim 10, wherein said models further comprise additional assembly components.

16. The method of claim 15, wherein said additional assembly components are retaining strips or screws.

17. An electronic device comprising a component manufactured using a system for manufacturing of tooling with a reduced lead time, said system comprises:
    a stock of pre-manufactured standard components created using a library of three-dimensional computer-aided design models; and
    a stock of custom manufacturing fixtures, for mounting said pre-manufactured standard components, wherein
    said pre-manufactured standard components are comprised of pre-hardened steel and
    each of said pre-manufactured standard components is configured for mounting on at least one of said custom manufacturing fixtures for machining features in said pre-manufactured standard components specific to a desired tool design, and wherein said tooling with the reduced lead time is manufactured using said system.

18. A component manufactured using a system for manufacturing of tooling with a reduced lead time, said system comprises:
    a stock of pre-manufactured standard components created using a library of three-dimensional computer-aided design models; and a stock of custom manufacturing fixtures, for mounting said pre-manufactured standard components, wherein said pre-manufactured standard components are comprised of pre-hardened steel and each of said pre-manufactured standard components is configured for mounting on at least one of said custom manufacturing fixtures for machining features in said pre-manufactured standard components specific to a desired tool design, and wherein said tooling with the reduced lead time is manufactured using said system.

19. The electronic device of claim 17, wherein said tooling is mold tooling.

20. The component of claim 18, wherein said tooling is mold tooling.

21. A system, comprising:

pre-manufactured means for storing, created using a library of three-dimensional computer-aided design models; and fixture means, for mounting said pre-manufactured; means, wherein said pre-manufactured means are comprised of pre-hardened steel, each of said pre-manufactured means is configured for mounting on at least one of said fixture means for machining features in said pre-manufactured standard components specific to a desired tool design, and wherein tooling with a reduced lead time is manufactured using said system.

22. The system of claim 21, wherein said pre-manufactured means for storing is a stock of pre-manufactured standard components, and wherein said fixture means is a stock of custom manufacturing fixtures.

* * * * *